Figure 1:
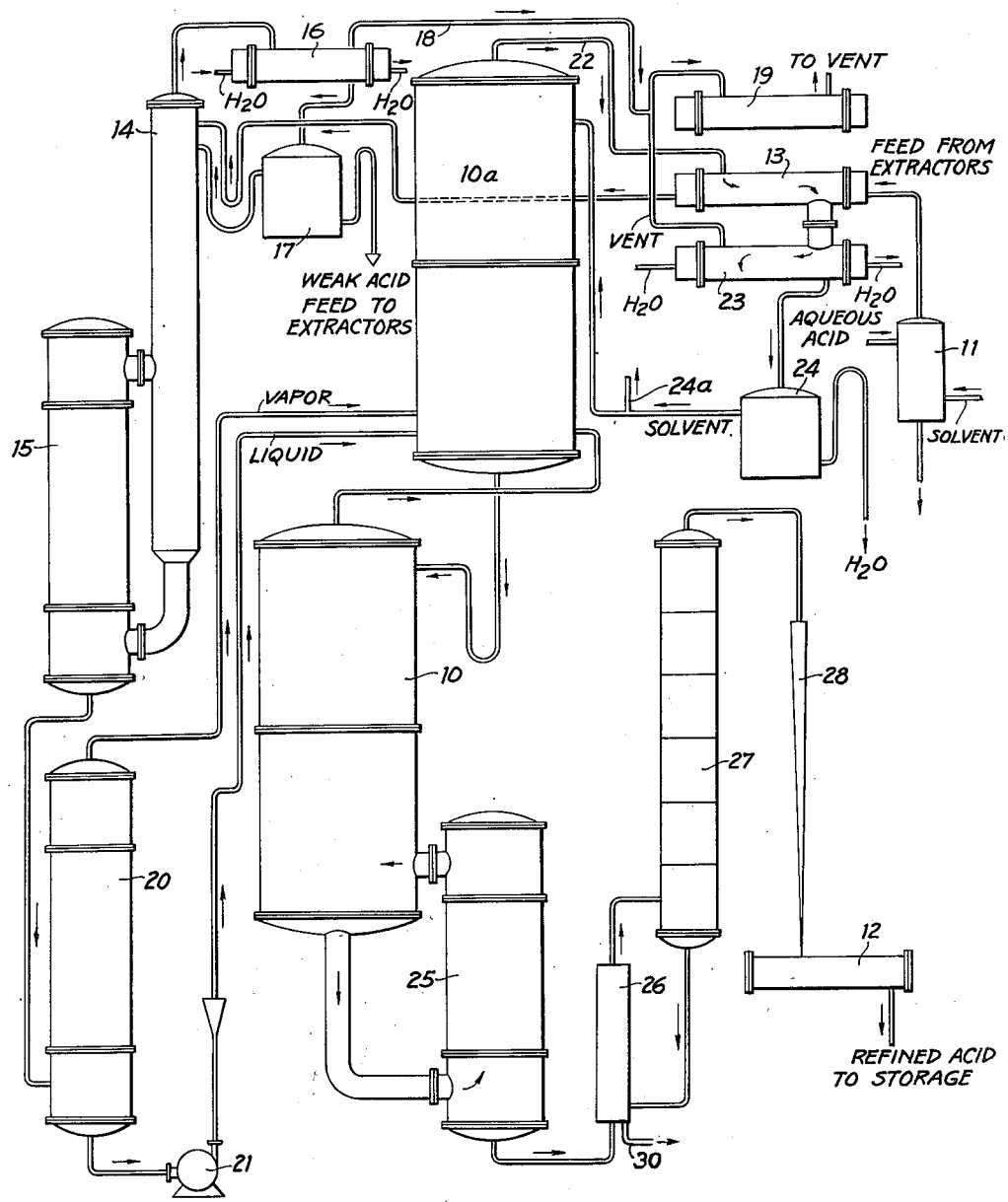

Feb. 1, 1955 M. F. QUINN 2,701,233
AZEOTROPIC DISTILLATION
Filed April 9, 1952 2 Sheets-Sheet 1

MARTIN F. QUINN
INVENTOR.

BY
ATTORNEYS

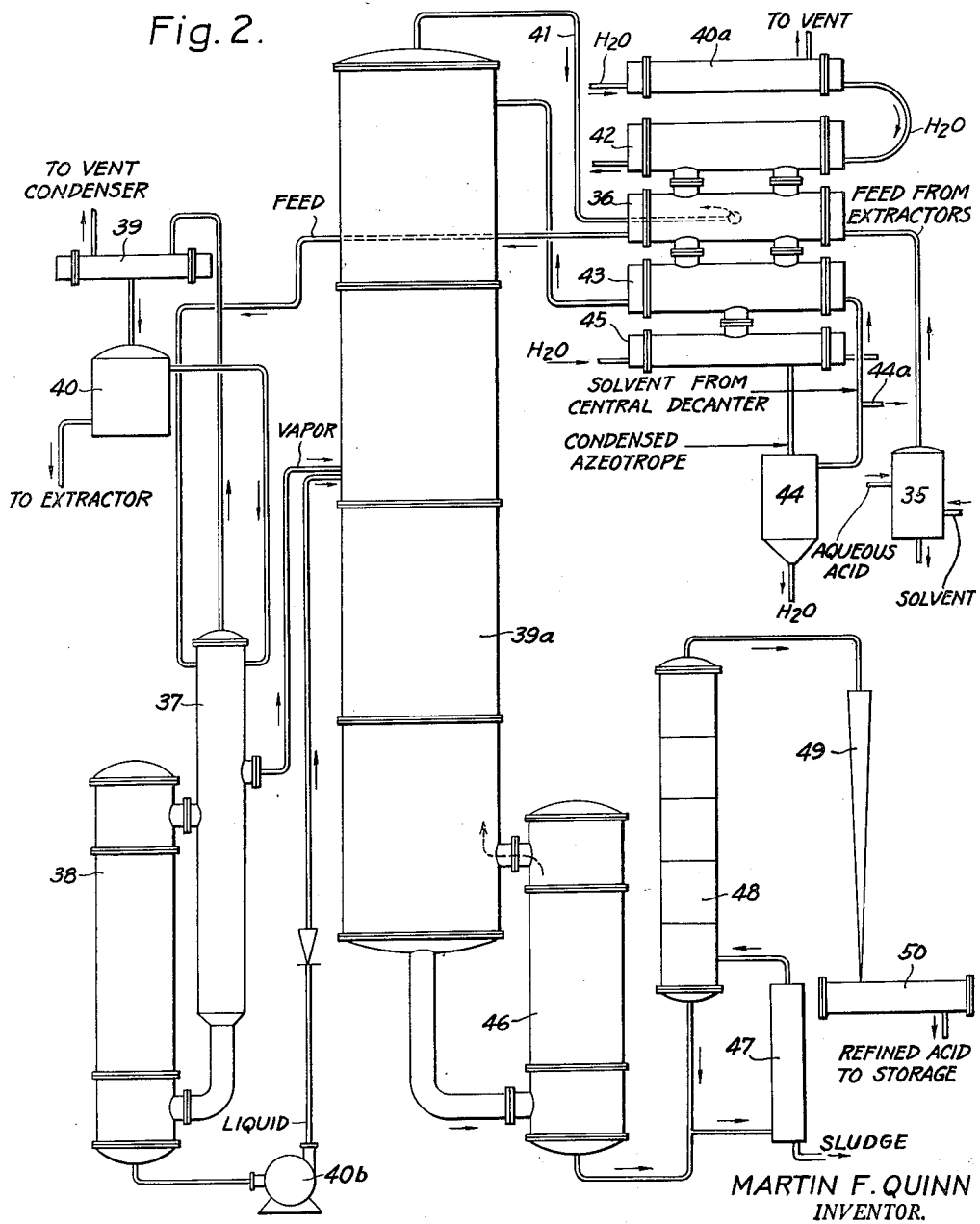

United States Patent Office 2,701,233
Patented Feb. 1, 1955

2,701,233

AZEOTROPIC DISTILLATION

Martin F. Quinn, Kingsport, Tenn., assignor to Eastman Kodak Company, Rochester, N. Y., a corporation of New Jersey Application April 9, 1952, Serial No. 281,339

3 Claims. (Cl. 202—42)

This invention relates to the separation of lower aliphatic acids of high purity from water solutions of these acids, and particularly from solutions of such acids with water and solvent carried over from a solvent extraction operation.

The invention is particularly concerned with the purification of acids which may contain solids, such as for example acids recovered from cellulose esterification operations. In the past it has been customary to pass the impure acids through a solvent extraction step in which a solvent such as a lower aliphatic acid ester was used to remove part of the water from the acid-water solution, after which the feed from the extraction operation was vaporized and fed to an azeotropic distillation unit. The feeding of vapors alone to the azeotropic unit was considered to be the only practical mode of operation because of the presence of dissolved solids, such as cellulose esters, in the feed from the extraction operation. The theory was that by feeding only vapor to the azeotropic distillation unit, no solids would reach this unit. The solids which were left behind in the still from which the solution was vaporized, were removed as a slurry or sludge from the feed vaporizer.

I have now found that contrary to the previous beliefs, it is highly advantageous to feed both liquid and vapor from the feed preheater to an intermediate level of the azeotropic distillation column, and preferably to the same level or stage of the azeotropic distillation. I have also found that the vaporization of the feed can be combined with deaeration of the feed by which corrosion of the expensive azeotropic distillation unit may be reduced to a minimum.

Among the most important of the numerous advantages which result from the use of the liquid-vapor feed comprising my invention are the following:

1. *Steam economy.*—The feeding of both liquid and vapor to an intermediate section of the azeotropic distillation column results in a more efficient use of the section of the column below the point of introduction of the liquid feed. This permits operation of the column with less return of liquid as reflux to the upper end of the column. Since such reflux liquid is made up of condensed vapors from the top of the column and has given up latent heat in being condensed, less steam is needed for heating the feed vaporizer as the amount of liquid reflux returned to the upper end of the column is diminished.

2. *Increased capacity.*—With the reduction in the quantity of reflux, relatively more solvent and water can be removed from the top of the column without increasing the total flow of vapor at the top. This results in increased acid production.

3. *Better quality acid.*—Even with less reflux the column is more efficient than with the vapor feed alone, resulting in better quality (higher purity) acid product.

4. *Reduced acid loss.*—Accompanying advantage 3 above is a reduced loss of acid in water removed from the top of the column.

5. *Non-fouling of feed heater tubes.*—Because of continuous removal of solids along with the liquid taken from the feed vaporizer or heater for passage to the azeotropic column, solids do not deposit on the tubes of the feed heater.

6. *Use of low pressure steam.*—The feed heater can be operated with low pressure steam (around 15 lbs.) because its efficiency does not become diminished by fouling of the tubes, and also because the liquid does not stand in the feed vaporizer with the resulting increase in concentration of solids, which would cause the boiling point of the liquid to increase.

7. *Elimination of necessity for sludge removal from feed heater.*—As explained under 8 below, it is preferable to remove sludge from the vaporizer of the azeotropic column.

8. *Improved condition of sludge removed from product vaporizer for azeotropic column.*—The sludge is removed from the product vaporizer of the azeotropic column and since it has passed through the azeotropic distillation process it is anhydrous and solvent-free. This is advantageous because the solids are in solution, allowing them to be drawn off continuously through a small orifice.

It is an object of the invention to improve the azeotropic distillation purification of lower aliphatic acids mixed with water and solvent from a solvent extraction operation by vaporizing the liquid before it is fed to the azeotropic column and feeding both liquid and vapor from this vaporization step to an intermediate level of the column, preferably to the same level. This object is particularly applicable when the acid-water-solvent mixture contains dissolved solids such as cellulose esters.

It is a further object of my invention to combine the vaporizing of feed to the azeotropic still with the deaeration of this feed liquid, thereby simplifying the apparatus and rendering it more efficient.

These and other objects of the invention will be apparent from consideration of the following specification when taken in conjunction with the accompanying drawings in which Fig. 1 is a semi-diagrammatic representation of apparatus for carrying out the separatory process; and Fig. 2 is a similar representation of a simplified form of the apparatus and process.

Referring now to the drawings, there is shown in Fig. 1 azeotropic distillation column means 10 and 10a which are connected together in an appropriate manner so as to constitute in effect a single column. This column serves for the purification of a mixture of lower aliphatic acid such as acetic acid, water and solvent coming from a solvent extraction apparatus represented at 11. The acid after being refined is cooled at 12 and then passes to storage.

The extraction apparatus 11 is connected to a heat exchanger 13 where the feed of acid, water and solvent is pre-warmed by passing in out-of-contact heat exchange with vapors from the azeotropic distillation column 10a, these vapors being cooled during this heat exchange, and this cooling being part of the means for condensing these vapors as will be described in greater detail presently. Heat exchanger 13 is connected to the upper end of a deaeration column 14 which operates in conjunction with a deaeration heater 15 which may be heated by steam or other suitable means (not shown). The upper end of the column 14 is connected to a deaeration condenser 16 which is cooled by any suitable means such as water, and a decanter 17 is provided for receiving the condensate from heat exchanger 16. Uncondensed gases from this heat exchanger leave by conduit 18 and pass to a vent condenser 19 from which they are vented.

The upper or organic layer in decanter 17 is returned to the upper end of deaeration column 14, while the lower or watery layer is recycled to the weak acid feed to the solvent extraction apparatus. The lower end of deaeration heater 15 is connected to a feed heater 20 which is heated in a suitable manner such as by coils for low pressure steam (around 15 lbs.). The upper end of the feed heater 20 is connected to the lower end of the upper section 10a of the azeotropic column so as to feed vapor from the feed heater to the column. The lower end of the feed heater 20 is connected to the same region of the azeotropic column section 10a through a pump 21.

Vapors from the upper end of column 10a pass by means of line 22 to heat exchanger 13 where they serve to warm the feed liquid coming from the extractor apparatus 11. These vapors and any condensate then pass to another heat exchanger 23 through which water is passed to complete the condensation, the resulting liquid then passing to a decanter 24. Uncondensed gases from heat exchanger 23 pass to vent condenser 19 and then are vented.

The upper portion of decanter 24 is connected to the upper end of azeotropic column 10a to provide for the passing of a portion of the organic layer from the condenser to the column as reflux. The portion of the organic layer which is not refluxed is taken off as at 24a for reuse in the solvent extraction step. The water layer from decanter 24 may be discarded or reused as desired.

The lower portion 10 of the azeotropic column is provided with a base heater 25 connected to receive the liquid in the lower end of the azeotropic column and to vaporize some of this liquid and return it to the column to maintain the proper heat balance. The base heater is connected to a product vaporizer 26 which serves as the still for a refining column 27, the upper end of which is connected to a condenser which may be of the tapered tube type as represented at 28, and the condensate passes to cooler 12 which has been mentioned above.

In operation the acid-water mixture which has been taken, for example, from the manufacture of cellulose ester is passed through the solvent extraction apparatus 11 where a substantial proportion of the water is removed. For example, the acid to water ratio may be reduced from about 1:3 to 1:0.6. The liquid from the extractors, containing acid, water and solvent, then passes through heat exchanger 13 where it is warmed by the vapors from the upper end of azeotropic column 10a, and the feed liquid then passes into the upper end of deaerator column 14 and into the deaerator heater 15. Liquid vaporized from the upper end of column 14 passes through a condenser 16 and the condensate flows to decanter 17. The uncondensed gases pass by means of line 18 to vent condenser 19 and are then vented.

The watery layer from decanter 17 is returned to the extraction operation with the weak acid feed and the organic layer is returned to the upper end of column 14.

The deaerated liquid in the lower end of heater 15 passes to the feed heater 20 where it is boiled, and both liquid and vapor from this heater are passed into the azeotropic column arrangement 10, 10a. For example they may be passed to the lowermost plate of the upper section 10a of this column.

The base heater 25 of the azeotropic column vaporizes part of the liquid at the bottom of the column and returns this vapor to the column to maintain the proper heat balance. Vapors issuing from the upper end of column 10a are directed to heat exchanger 13 to heat the feed and become cooled, and they then pass to water cooled condenser 23 where their condensation is completed. The condensate passes to decanter 24 and part of the organic layer in this decanter is returned to the upper end of column 10a as reflux, while the remainder of the organic layer is taken off at 24a for reuse in the extraction operation. The water layer from decanter 24 may be discarded or reused as desired.

Liquid from base heater 25 passes to a heated product vaporizer 26 from which the acid vapors are directed to a refining column 27. Liquid in the lower end of this column is returned to the vaporizer 26. The vapors issuing from the upper end of column 27 pass through the condenser 28 and the condensate is cooled at 12 and then passes to the storage facilities for the refined acid. This acid is of very high purity of the order of 99.9%. Sludge is removed from product vaporizer 26 through line 30.

Fig. 2 shows a somewhat simplified form of the apparatus shown in Fig. 1, this form being characterized by elimination of the separate feed heater 20 of Fig. 1 and the taking of liquid and vapor feed for the azeotropic column from the deaeration heater and column. In this figure the azeotropic column is shown at 39a as a single column and the heat exchanger in which the feed from the extraction apparatus 35 is warmed by the vapors from the azeotropic column is shown at 36. The liquid feed passes from this heat exchanger to the upper end of deaerator column 37, which column is provided with a combined feed and deaeration heater 38. Vapors are taken from the upper end of column 37 and passed to a deaeration condenser 39, the condensate from which passes to a decanter 40. Uncondensed gases from condenser 39 pass to vent condenser 40a from which they are vented. The watery layer from decanter 40 is recycled to the solvent extraction apparatus with the weak acid feed, and the organic layer from the decanter is returned to the upper end of column 37.

Heater 38 receives heat from suitable means such as a low pressure steam coil which heats the liquid therein to boiling. Vapors are taken from an intermediate portion of column 37 and directed to an intermediate part of an azeotropic column 39a, and liquids from heater 38 are forced by means of pump 40b into column 39a at this same location.

Azeotropic distillation is carried out in column 39a and the azeotrope of water and solvent leaves the column in vapor form through line 41 for passage to the heat exchanger 36 and then to a water cooled heat exchanger 42. From heat exchanger 42 the azeotropic vapors and condensate pass through a heat exchanger 43 where they pass in out-of-contact heat exchange with solvent flowing from decanter 44 back to column 39a as reflux. The azeotrope vapors and liquid then pass through another water cooled condenser 45 and then to the central decanter 44. The portion of the solvent from decanter 44 which is not used for reflux may be reused in the solvent extraction step. A take-off for this purpose is shown at 44a.

The azeotropic column 39a is provided with a base heater 46 connected to a product vaporizer 47, a refining column 48, a condenser 49 and a cooler 50, all of which serve the same purpose as the corresponding elements 25–28 and 12 in Fig. 1.

In operation, the feed from the extraction step is warmed in heat exchanger 36 and then passes to deaerator column 37 where air and other gases which might increase corrosion in the distillation apparatus are separated after passing through deaerator condenser 39. The separation of organic and water layers in decanter 40 increases the purity of acid which is returned to the deaerator column 37. The combined feed and deaeration heater 38 which is connected to column 37 provides the means for vaporizing the liquids which pass to column 37, and a portion of the resulting vapors is taken from an intermediate location in column 37 and passed to an intermediate portion of azeotropic column 39a. At the same time, liquid is pumped from the heater 38 to the same location in column 39.

An azeotrope of water and solvent leaves the azeotropic column through line 41 and passes to heat exchanger 36 where it warms the feed from the extractors, then passes to water cooled heat exchanger 42, then to heat exchanger 43 where it imparts heat to solvent being refluxed to column 39a, and then to another water cooled condenser 45 where the condensation of the azeotrope is completed. The condensate from heat exchanger 45 is directed to decanter 44 where the solvent and water are separated, a portion of the solvent being returned to column 39a through heat exchanger 43 as reflux, and the remainder of the solvent being taken for reuse in the extraction operation.

Liquid from the bottom of azeotropic column 39a is heated in base heater 46 where some of this liquid is vaporized and returned to the column. Liquid from base heater 46 passes to a product heater 47 and then to a refining column 48, the vapor from which is condensed at 49 and cooled at 50, after which the highly pure acid product is passed to storage.

Either the plural, series azeotropic column of Fig. 1 or the single column of Fig. 2 may be used in either embodiment.

The following examples are illustrative of the invention but it is to be understood that the invention is not to be considered as limited thereto.

*Example 1*

In one example using the arrangement of Fig. 1 an impure acetic acid solution from the manufacture of cellulose acetate was subjected to solvent extraction using isopropyl acetate as the extracting solvent. A feed comprising approximately 21% acetic acid, 12% water and 67% solvent was then fed to the deaerator column 14. The liquid returned to column 14 from decanter 17 was about 5% acid, 3% water and 92% solvent.

The solution was boiled in feed heater 20 and liquid and vapor feed to the 26th plate of the 26-plate column 10a in a liquid to vapor ratio of about 3:2, reducing the reflux ratio at the top of the column from 1:1 with vapor feed only, to a ratio of 5:1.

Acid of about 99.9% purity was recovered at 12 and the still capacity was increased by about 38% over the same still using only vapor feed. A steam savings of about 0.5 pound of steam per pound of acid concentrated was obtained.

*Example 2*

Results and advantages similar to those of Example 1 were achieved where a small amount of propionic acid was present in the feed along with the acetic acid. The resulting mixed acid was of a purity comparable to the product of Example 1.

*Example 3*

An impure mixed acid consisting of acetic and butyric acids in a ratio of about 4:1 was treated in the extraction step using iso-propyl acetate as the solvent and then was fed to the other apparatus of Fig. 1. Feed to the azeotropic column was about 30% liquid and 70% vapor and the still capacity was found to be 20% greater than with the use of vapor feed alone. Steam savings were about 0.3 pound of steam per pound of mixed acid recovered. Mixed acid of about 99.9% purity was obtained.

Similar results are obtained when the solutions of Examples 1-3 are separated in the apparatus of Fig. 2.

I claim:

1. A process for producing dehydrated acid from aqueous solutions recovered from cellulose esterification operations and containing a lower aliphatic acid, cellulose ester solids soluble in concentrated acid and a solvent residue from a solvent extraction operation, comprising heating a body of the solution to evaporate therefrom a vapor containing a higher percentage of water than the original feed solution, separately withdrawing from said body of solution hot liquid approaching in composition the water-acid azeotrope and containing said cellulose ester solids, introducing the vapor and hot liquid into a vertical distillation column at vertically spaced points intermediate of the ends of the column and with the vapor feed to the column located above the hot liquid feed to the column, and recovering dehydrated acid as bottoms from said column.

2. A process for producing dehydrated acid from aqueous solutions recovered from cellulose esterification operations and containing a lower aliphatic acid, cellulose ester solids soluble in concentrated acid and a solvent residue from a solvent extraction operation, comprising heating a body of the solution to evaporate therefrom a vapor containing a higher percentage of water than the original feed solution, separately withdrawing from said body of solution hot liquid approaching in composition the water-acid azeotrope and containing said cellulose ester solids, introducing the vapor and hot liquid into a vertical distillation column at a level intermediate the ends thereof, and recovering dehydrated acid as bottoms from said column.

3. A process for producing dehydrated acetic acid from aqueous solutions recovered from cellulose esterification operations and containing acetic acid, cellulose ester solids soluble in concentrated acid and a solvent residue from a solvent extraction operation, comprising heating a body of the solution to evaporate therefrom a vapor containing a higher percentage of water than the original feed solution, separately withdrawing from said body of solution hot liquid approaching in composition the water-acid azeotrope and containing said cellulose ester solids, introducing the vapor and hot liquid into a vertical distillation column at an intermediate level thereof, feeding bottoms from said column to a further vaporizing step for further refining, and removing cellulose ester sludge from said further vaporizing step.

References Cited in the file of this patent

UNITED STATES PATENTS

| | | |
|---|---|---|
| 1,541,296 | Uhlein | June 9, 1925 |
| 1,917,391 | Othmer | July 11, 1933 |
| 2,108,659 | Dunham | Feb. 15, 1938 |
| 2,199,982 | Bright et al. | May 7, 1940 |
| 2,290,483 | Othmer | July 21, 1942 |
| 2,593,931 | Stearns | Apr. 22, 1952 |

FOREIGN PATENTS

| | | |
|---|---|---|
| 759,351 | France | Nov. 16, 1933 |